United States Patent
Rao (10) Patent No.: US 6,581,056 B1
(45) Date of Patent: Jun. 17, 2003

(54) INFORMATION RETRIEVAL SYSTEM PROVIDING SECONDARY CONTENT ANALYSIS ON COLLECTIONS OF INFORMATION OBJECTS

(75) Inventor: Ramana B. Rao, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/670,546

(22) Filed: Jun. 27, 1996

(51) Int. Cl.[7] .............................................. G06F 17/30
(52) U.S. Cl. .................... 707/5; 707/6; 707/4; 707/2; 707/10; 704/10
(58) Field of Search .............................. 707/5, 10, 6, 4, 707/2, 16; 395/346, 140, 770; 704/10, 9

(56) References Cited

U.S. PATENT DOCUMENTS

| | | | | | |
|---|---|---|---|---|---|
| 5,121,478 A | * | 6/1992 | Rao | ........................... | 395/346 |
| 5,265,065 A | * | 11/1993 | Turtle | ........................... | 707/4 |
| 5,418,948 A | * | 5/1995 | Turtle | ........................... | 707/4 |
| 5,442,778 A | * | 8/1995 | Pedersen et al. | ............... | 707/5 |
| 5,488,725 A | * | 1/1996 | Turtle et al. | .................... | 707/5 |
| 5,515,488 A | * | 5/1996 | Hoppe et al. | ............... | 395/140 |
| 5,632,009 A | * | 5/1997 | Rao et al. | .................... | 395/770 |
| 5,657,450 A | * | 8/1997 | Rao et al. | ...................... | 707/10 |
| 5,659,732 A | * | 8/1997 | Kirsch | ........................... | 707/5 |
| 5,675,819 A | * | 10/1997 | Schuetze | ...................... | 707/10 |
| 5,724,567 A | * | 3/1998 | Rose et al. | ...................... | 707/2 |
| 5,724,571 A | * | 3/1998 | Woods | ........................... | 707/5 |
| 5,745,893 A | * | 4/1998 | Hill et al. | ...................... | 707/5 |
| 5,781,879 A | * | 7/1998 | Arnold et al. | .................. | 704/9 |

OTHER PUBLICATIONS

Rao et al. "Rich Interaction in the Digital Library", Communications of the ACM, v.38, n.4, p. 29–39, Apr. 1995.*
Rao et al. "System Components for Embedded Information Retrieval from Multiple Disparate Information Sources", ACM UIST'93, p. 23–33, Nov. 3, 1993.*

* cited by examiner

Primary Examiner—Charles L. Rones
(74) Attorney, Agent, or Firm—Richard B. Domingo (57) ABSTRACT

An information retrieval system having a secondary content analysis engine for use on collections of documents. Such collections of documents dynamically arise as a result of queries one or more, possibly distal, information sources. The secondary content analysis engine resides on an Information Access client computer system and allows the user to: 1) iteratively refine queries in more powerful ways than typically supported by relevance feedback or other query modification methods, 2) browse a medium-sized collection of documents (on the order of 1000 items) in more effective ways than is traditionally possible or 3) obtain more information for increasing user understanding of the collection.

20 Claims, 5 Drawing Sheets

INFORMATION RETRIEVAL SYSTEM PROVIDING SECONDARY CONTENT ANALYSIS ON COLLECTIONS OF INFORMATION OBJECTS

FIELD OF THE INVENTION

The present invention is related generally to the field of information retrieval from one or more distal information sources, and in particular to techniques for enabling a user to more efficiently generate queries and browse the results of queries.

BACKGROUND OF THE INVENTION

With the advent of networking technology, the ability to access information from distal information sources has greatly increased. The explosive growth of the Internet and commercial on-line networks and databases (collectively referred to as information sources) are indicative of the high demand for easily accessible information. When interacting with a large information source, a user typically writes a query that returns on the order of 1000 items (which is referred to here as a medium-sized collection). This is about one and a half orders of magnitude more than can be dealt with directly by the user in most task situations. Thus, the user might view a few items, and then narrow the scope and resubmit the query to decrease the number of result items. This cycle is usually repeated many times until the user arrives at a manageable set of documents to view in detail, typically 30–50 documents. This process is referred to as iterative query refinement.

This process has a number of well-known problems, most notably that it is time-consuming and that it often ineffective for arriving at a good collection of 30–50 documents. Often, overly-aggressive attempts to reduce the result set to a manageable size can lead to queries that lock in on too narrow a specification of what is sought. This happens because only a few items are browsed per cycle, and thus very little available information is used to make refinement decisions in each cycle.

Various techniques are used for aiding query refinement. A simple technique is to provide the number of hits for each of the search terms, and/or the number of hits for specified logical combinations of the search terms. This helps the user to determine if there is a problem with a particular search term or logical combination (i.e. it is overly broad or too narrow), or if the search requires more terms for narrowing the number of hits.

Another technique is known as relevance feedback. The essence of this technique is that a user indicates documents in a result set that are relevant. Typically, an automatic procedure is used to reweight, add, or remove terms in a subsequent query (although some systems permit this to be done by the user). Though relevance feedback is most often used in the context of a ranking model of retrieval (i.e. one that scores and orders results), it has also been used in a Boolean context. For example, The European Nuclear Documentation System (ENDS) automatically constructs a Boolean query based on co-occurence of terms in at least 2 documents selected as relevant.

Other known techniques for supporting iterative query refinement include scatter/gather and snippet search. Each of these techniques provide more efficient means of browsing a collection in order to refine the query.

The problem of query refinement is exacerbated when the query is directed towards multiple disparate information sources (databases). This is because each of the information sources may have different functional capabilities, different search engines, operate under different protocols, etc. There are no known systems which been designed to provide aids for query refinement on collections of documents that have been obtained responsive to a query to multiple disparate information sources.

SUMMARY

An information retrieval system which provides for secondary content analysis of retrieved collection of documents is disclosed. The collection of documents is the result of a query to one or more information sources, e.g. databases. The secondary analysis may be performed for various reasons such as summarization of the collection, navigation through the collection, understanding the relationship between the documents in the collection or for query refinement. In the currently preferred embodiment, the secondary analysis is comprised of generating statistical information which may be used for query refinement and for more effective browsing of the ephemeral document collection. The analysis performed is termed secondary since some primary analysis may have been performed at the information sources. The secondary content analysis is performed on an Information Access (IA) client which can couple to the various information sources.

The general method of query, refinement and browsing enabled by the present invention is comprised of the steps of: a user generating a query, the query translated and transmitted to the respective information sources, the results returned and collected, secondary content analysis performed on the returned collection wherein document level and collection level statistics are obtained, the user selects a query refinement option, the statistics are used to provide the selected option, and the user refines their query as needed.

When the document collection is comprised of a collection of primarily textual documents, the process of generating the secondary content analysis is generally comprised of the steps of: tokenizing document text, filtering the tokens according to the type of statistics to be collected and collecting the statistics from the remaining tokens.

In addition to aiding the query refinement process, the performance of secondary content analysis on a collection of documents has other advantages. First, it permits more efficient browsing. Second it permits the use of the query refinement and browsing techniques on documents from information sources that do not support such functions.

DETAILED DESCRIPTION OF THE PREFERRED EMBODIMENT

In an information retrieval system, a means for providing secondary content analysis on retrieved collections of documents is disclosed. The secondary analysis performed is for enabling functions that would facilitate better or more efficient use of the retrieved collection. Such functions would include providing better understanding of the collection on the whole, enhancing navigation through the collection, or for query refinement.

In the currently preferred embodiment, the secondary analysis performed enables refinement of a query to more precisely obtain the desired information. A subsequent query may be to either the retrieved collection or a new query to the multiple disparate information sources.

While the currently preferred embodiment is described for use in an information retrieval system capable of obtaining documents comprised primarily of text from multiple disparate information sources, the present invention may be used in any information retrieval system that can obtain a collection of documents. For example, the present invention may be used to perform a secondary analysis on a collection of documents comprised primarily of image information. Further, the currently preferred embodiment provides a Statistical Content Analysis (SCA) engine for operation on ephemeral collections of documents. Such collections are ephemeral for the duration of the query. This is not meant to be limiting as the present invention may also operate on persistent collections of documents.

Figure 1:
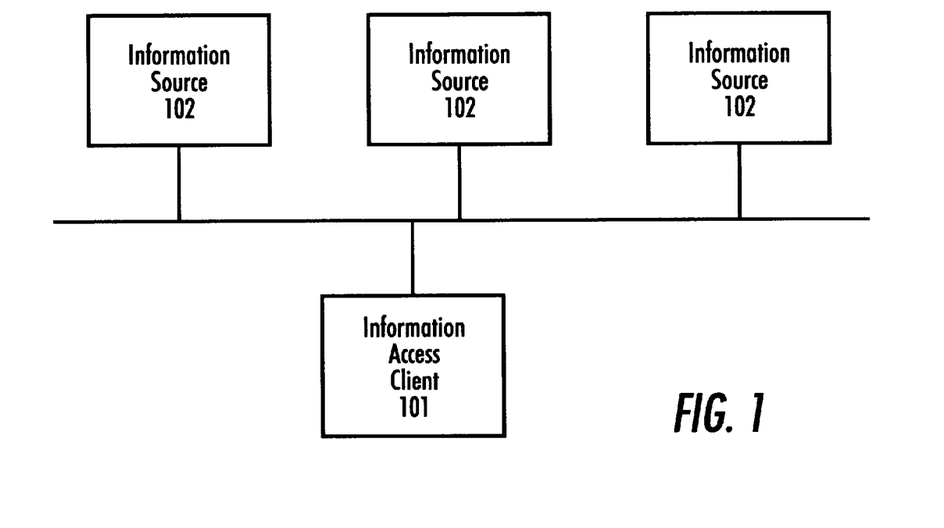
FIG. 1 is a block diagram of an information retrieval system for accessing multiple distal information sources as may be implemented in the currently preferred embodiment of the present invention.

Overview of the Information Retrieval Architecture of the Currently Preferred Embodiment The information retrieval architecture of the currently preferred embodiment is illustrated with reference to FIG. 1. Referring to FIG. 1, an Information Access (IA) client 101 is coupled to a plurality of information sources 102. Connection to the information sources may be through a network, e.g. databases residing on the Internet, or via a direct connection to the communication source, e.g. direct dial-up to Dialog™ Information Source databases.

The IA clients 101 provide both browsing and search interfaces to the information sources 102. A browsing interface supports the browsing of items and collections provided by the information sources 103 and potentially navigating from one item to other connected items. A search interfaces supports specifying and refining queries, controlling searches, and utilizing the results of searches in various ways. The ephemeral statistical content analysis engine is functionality which reside within the IA client 101.

Each of the information sources 102 manage a repository of information (e.g. collections of papers, articles or other document types) and provide access to it through some access protocol. The access protocol may be either one of the de facto standards (e.g. Z39.50) or a server specific protocol (e.g. as used in the Dialog™ On-line information source). Thus, the IA client is capable of communicating using the protocol of the server.

Figure 2:
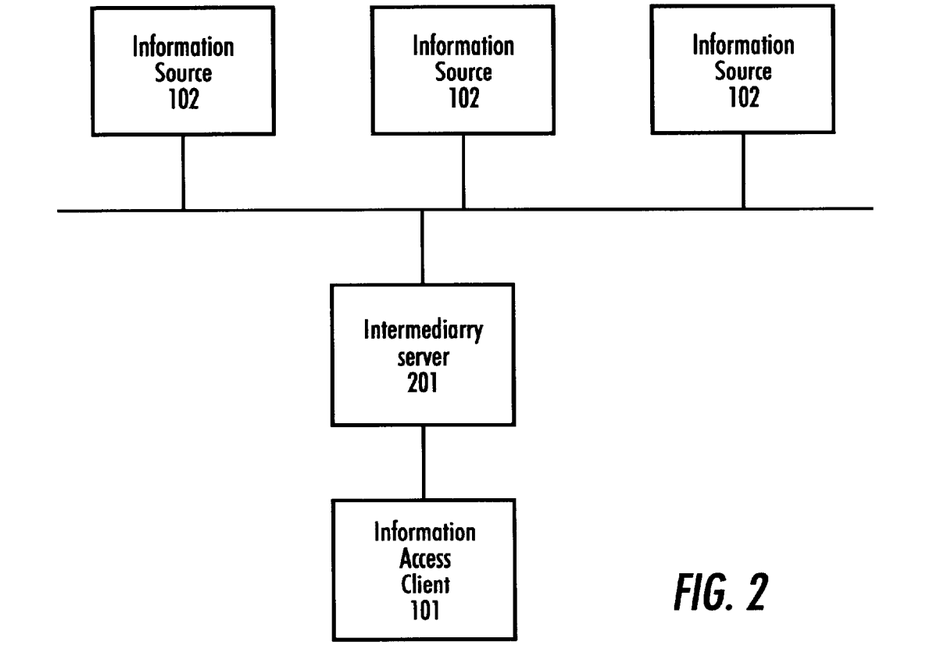
FIG. 2 is a block diagram of an alternative information retrieval system for accessing multiple distal information sources

An alternative information retrieval architecture is described with reference to FIG. 2. The alternative architecture incorporates an intermediary server 201 which mediates access requests between the IA client 101 and various information sources. This alternative information retrieval architecture is described in the article entitled "System Components For Embedded Information Retrieval From Multiple Disparate Information Sources", Ramana B. Rao, Daniel M. Russell, and Jock D. Mackinlay, Proceedings of 1993 ACM Symposium on User Interface Software and Technology, Atlanta, Ga., November 1993 ACM SIGGRAPH and SIGCHI.

The intermediary server 201 mediates the operations between IA client 101 and information sources 102. The intermediary server 201 acts as a protocol gateway. The intermediary server 201 communicates with the IA client 101 according to a generic protocol optimized for local interactions between a client and server. The intermediary server relays the operation requests to the information sources using the protocol of the information sources. The intermediary server 201 may also provides various services for enabling a user to make more efficient use of the information sources (e.g. information describing the available information sources or estimates on the cost of performing an operation on particular information sources).

It should be noted that the intermediary server 102 may also be a location for a statistical content analysis engine.

Figure 3:
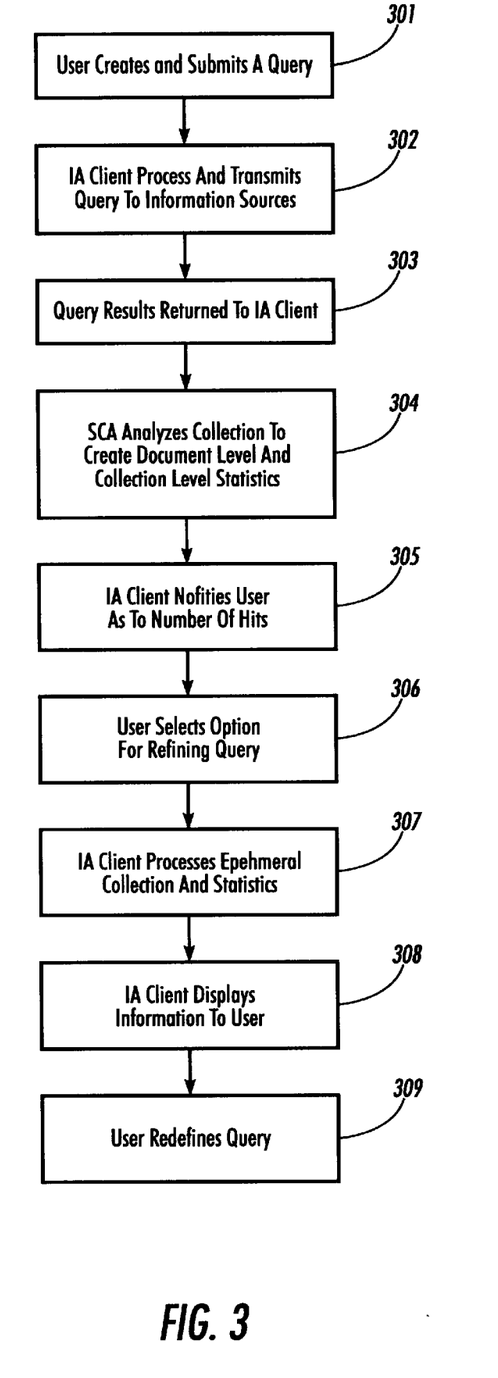
FIG. 3 is a flowchart illustrating the general steps for querying, retrieving and query refinement in the currently preferred embodiment of the present invention.

FIG. 3 is a flowchart illustrating the basic steps for querying, retrieving and query refinement as may be performed in the currently preferred embodiment of the present invention. Referring to FIG. 3, a user makes a query, step 301. It is assumed at this point that the query was one that will require further refinement. The query is processed by the IA client and "translated" for transmission to the information sources associated with the query, step 302. As described above, each of the various information sources may communicate using a different protocol and each may have different search capabilities. In this step any necessary protocol conversions are performed along with any modifications for a particular information source that are necessary in order to make a "best effort" to perform the query as requested. After some period of time the results of the query to the information sources are returned and collected by the IA client, step 303. In this case the entire documents may be downloaded, so what is obtained is a whole collection of full text documents. In any event, what the user now has is an ephemeral collection of documents that have been gathered from multiple information sources.

General techniques for processing a collection documents to aid retrieval may now be performed on this ephemeral collection. The statistical content analysis engine within the IA client analyzes the resulting collection of documents and generates document and collection level statistics that may later be used to help a user refine their query, step 304. This analysis is described in greater detail below. In any event, when the results are received, the IA client notifies the use as the number of hits, step 305. From this number of hits the user can determine whether or not the query needs refinement. For purposes of this description, it is assumed that the query needs refinement because of an excessive number of hits (if there were too few hits an entirely new query would be performed.)

At this point it should be noted that a user may not need all the rights currently associated with the downloading of documents. This ephemeral collection of documents could have been borrowed from the various Information Sources or otherwise obtained in a fashion that did not require the user to pay the full cost of receiving the document. The full cost of retrieving the document may be invoked when the user actually "views" the full text of the document. Thus, the present invention permits new types of billing schemes by the information source which may further drive use.

In any event, next the user selects one of the options for helping them refine their query, step 306. This would include relevance rating, scatter/gather, snippet search or any other practical technique. The appropriate processing is then performed on the ephemeral collection and associated statistics, step 307, and the information displayed to the user in the appropriate manner, step 308. From this, the user may then decide the best means to refine the query, step 309. Or as will be described below, sometimes the refined query is generated automatically responsive to user interactions.

IA Client

Figure 4:
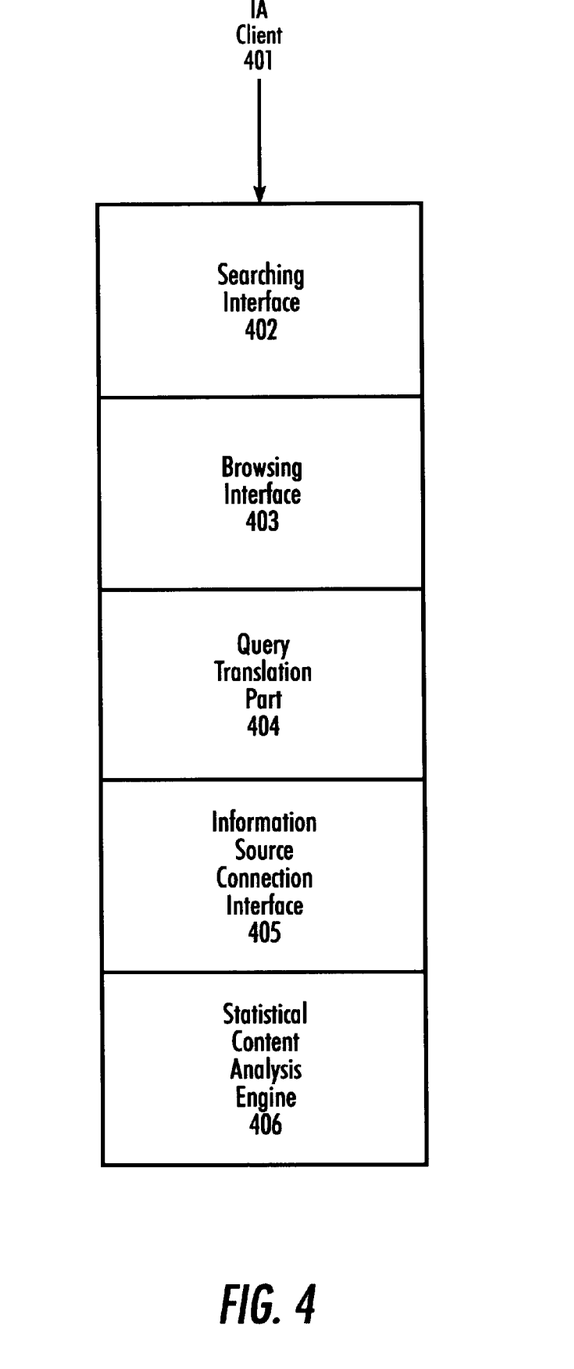
FIG. 4 is a block diagram describing the functional components of an Information Access (IA) client as may be utilized in the currently preferred embodiment of the present invention.

FIG. 4 is a block diagram illustrating the functional components of an IA client. The IA client 401 is typically comprised of a searching interface 402, a browsing interface 403, a query translation part 404, one or more information source connection interfaces 405 and statistical content analysis engine 406.

The searching interface 402 provides a means by which queries may be submitted to the various information sources. Typically, this would be a string of keywords each having some logical relationship. The way the resulting set of documents would be presented to the user may also be specified.

The browsing interface 403 provides a means by which the results of a query are viewed by the user. Typically, the browsing interface will render the data representing the document onto the display coupled to the computer based system on which the IA client resides. The rendering may also occur for audio based data. As will be described in more detail below, the browsing interface 403 may also use data generated by the ephemeral statistical content analysis engine 406 to create a more effective "high" level browsing which is used for refining the documents to be viewed.

The query translation part 404 processes a query into the protocol(s) utilized by each of the various information sources being accessed. The query translation part 404 may also modify the query for a particular information source in the event that the information source cannot support the original request (e.g. a request made that is restricted to a particular field).

The information source connection interface part 405 is the means by which the respective information sources are accessed. This may be by a direct dial-up connection or via a network connection (e.g. the Internet).

Finally, the statistical content analysis engine 406 processes an ephemeral collection of documents to create various statistics which may be used for refining a query and for more efficient searching of the information in the collection of documents.

Typically, the IA client is embodied in a computer based system controlled by operating software and which is interfaced with through a display and various input devices such as a pointer device or keyboard.

Statistical Content Analysis Engine

In the currently preferred embodiment, the IA clients are augmented with a special-purpose statistical content analysis (SCA) engine called an ephemeral SCA engine. It is the ephemeral SCA which performs a secondary content analysis. An ephemeral SCA engine is inherently useful since it permits the use of various query modification techniques on information sources that don't directly support such features.

An SCA engine processes documents by treating their contents as a sequence of tokens and gathering collection and document level object and token statistics (most notably token occurrence). A contiguous character string representing a word is an example of a token. So in the currently preferred embodiment of the present invention, an ephemeral collection of documents is processed by the SCA engine to yield various indexes and index terms that will supplement query refinement. A suitable process for analysis of a collection of documents (or database) is described in section 5 of an article entitled "An Object-Oriented Architecture for Text Retrieval", Doug Cutting, Jan Pedersen, and Per-Kristian Halvorsen, Xerox™ PARC technical report SSL-90-83.

The ephemeral SCA engine is specialized for usage on short-lived, dynamically-generated medium-sized collections that arise during interaction with the information sources. A medium sized collection is defined as approximately 1000 documents. In particular, this means that the tokenizing and indexing processes are tuned for rapidity, not persistence, reliability, or large collections as is typically the case for full-text statistical content analysis engines. Moreover, the tokenizing and indexing processes may be tuned for the specific types of query refinement tools supported.

Figure 5:
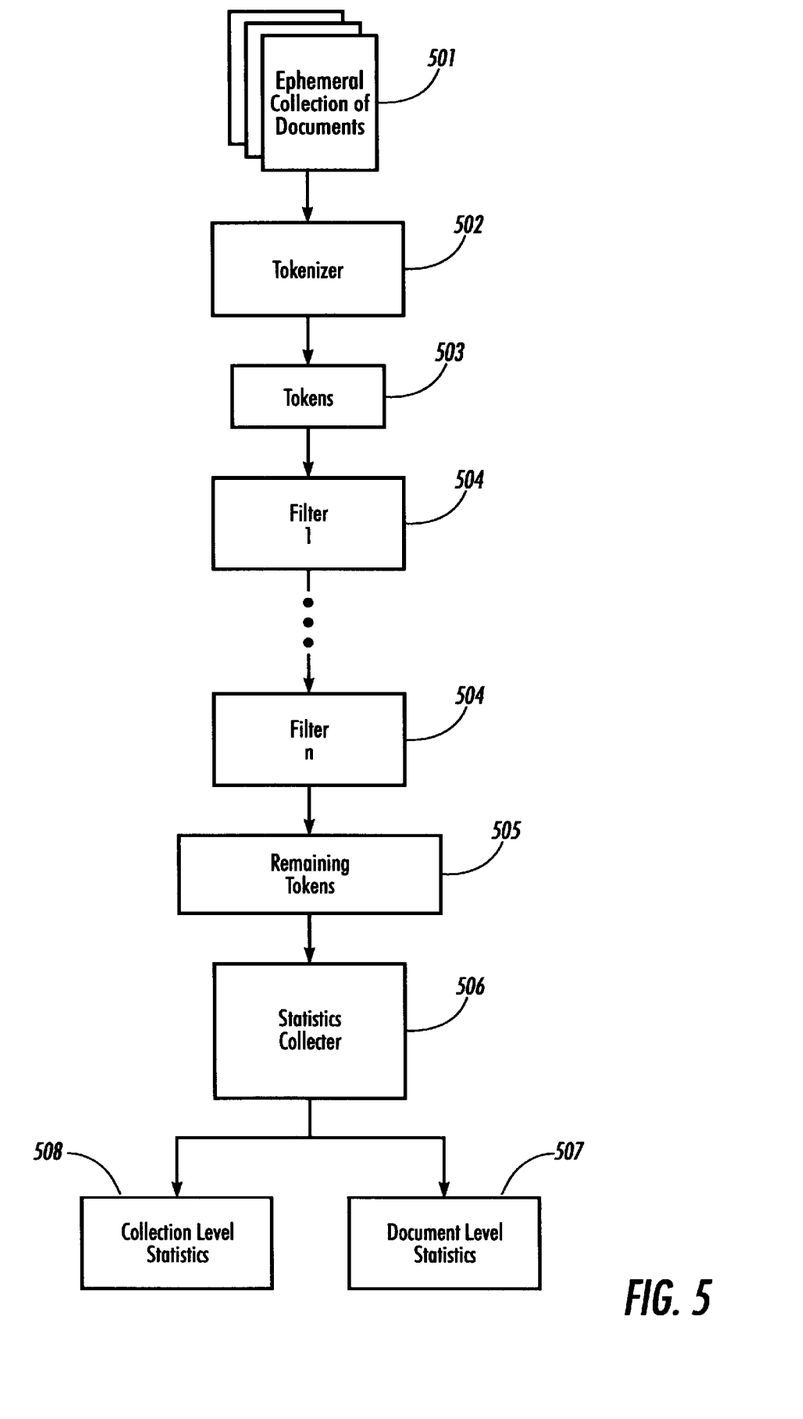
FIG. 5 is a flow diagram illustrating the processing of a statistical content analysis engine of the currently preferred embodiment of the present invention.

The process utilized by the ephemeral SCA engine is generally described with reference to the flow diagram of FIG. 5. Referring to FIG. 5, an ephemeral collection of documents 501 provide input to a tokenzier 502. It should be noted that each document is handled independently. The tokenizer 502 extracts tokens by parsing the text of a document and generating a token 503 for each contiguous sequence of characters (e.g. a word). The tokens are then processed through a series of filters 504. The filters will cause some of the tokens to be dropped out and some tokens to be combined. The filters perform such functions as generating stop lists, stemming, part of speech tagging or phrase spotting. Some of the filters may also be parameterized based on the terms used in the query. In any event, after going through the series of filters 504 the remaining tokens 505 that are output are input to a statistics collector 506 for collecting the document level statistics 507 and collection level statistics 508. These statistics may include token occurrences or proximity of words or phrases.

In order to operate in the environment of the present invention, the SCA engine provides for processing 1000 documents of 1000 tokens in 5–10 seconds. These numbers are estimates about a level of performance that would enable very powerful uses, though many tasks can withstand lesser performance. Such performance number are certainly attainable when one considers the ever increasing processing power of microprocessors as well as the corresponding increases in density of memory devices. As an example, there already exist various memory resident database systems. In such systems both the corpus of the data and the software instructions for accessing the database reside in the internal memory of a computer based system.

Query Refinement/Browsing Tools

An ephemeral SCA engine can allow the user to more easily utilize the information obtained by a query to formulate a more restrictive query and to evaluate higher-level strategy options. This is done by the use of various query refinement and browsing tools. The SCA engine of the currently preferred embodiment supports versions of relevance feedback, scatter/gather, snippet search, and similarity search. It is anticipated that other search aids which use the ephemeral SCA engine may be developed as appropriate.

In relevance feedback a user indicates documents in the ephemeral collection that are relevant. Typically, an automatic procedure is used to reweight, add, or remove terms in a subsequent query (although some systems permit this to be done by the user).

In scatter/gather and snippet search the focus is on "browsing" the result set to help refine a query. In scatter/gather a result set is automatically "scattered" into small collections of document-groups, along with a short summary. Based on the summaries, one or more of the groups is selected. The selected groups are then "gathered" to create a new result set. The new result set is then "scattered" as before and the process is repeated until groups of sufficient groups are obtained. Scatter/gather is described further in "Constant interaction-time scatter/gather of very large document collections, Cutting, D. R., Karger, D. R., and Pedersen, J. O., Proceedings of SIGIR'93 June 1993, and in "Scatter/gather: A cluster-based approach to browsing large document collections", Cutting, D. R., Karger, D. R., Pedersen, J. O., and Tukey, J. W., Proceedings of SIGIR'92, June 1992.

In scatter/gather, the user can take advantage of aggregate properties and a multitude of individual properties of matching items, rather than relying on ad hoc browsing of a few items. The user can then see how the result partitions and utilize terms from cluster term summaries or central documents to manually or automatically refine the query.

In snippet search portions of context surrounding a search term are displayable. This aids query reformulation by permitting indication of other discriminating search terms. Snippet search is further described in "Snippet search: A single phrase approach to text access", Pedersen, J. O., Cutting, D. R., and Tukey, J. W., Proceedings of the 1991 Joint Statistical Meetings, American Statistical Association (1991).

Snippet search provides more detailed evaluation of how exactly items matched the query. For example, snippet search or other proximity techniques can be used to locate interesting passages of matching documents to evaluate them, rather than relying on summary information like titles.

A similarity search find documents that are near by in a vector space using some distance metric. The vector space is an n-dimensional space with each word as a dimension, and a documents coordinate on each dimension being the number of occurrences of that word. Typically, the distance metric is a cosine of the angle between the vectors.

Other Uses of Secondary Content Analysis

Providing secondary content analysis at the IA client level has a number of other advantages:

1) If the initial query is believed to be of high recall, further interaction with the information sources can be curtailed, since further queries can be performed locally with respect to the secondary content analysis and the available query refinement and browsing tools.

2) The various techniques and advantages (e.g. scatter/gather, relevance feedback) apply when dealing with multiple information sources, together or in sequence. Thus, items obtained from different sources can be browsed using scatter/gather or items found in one source can be used to formulate a query for another source.

3) User-generated information like reports or papers can be processed by a secondary content analysis and used to find related information in external sources. For example, a paper describing an invention could be processed and used to generate a query on a database containing issued patents.

4) Structuring and analyzing medium-sized collections using the statistics provided by the secondary-content analysis may be of direct value in the larger process of information sense-making, independently of its value in retrieval.

5) Secondary content analysis supports new models of billing for the information sources. As described above, an information source may provide documents for the purpose of performing a secondary analysis at a lower cost then viewing. When a document is to be viewed, a different higher price may be used. This may encourage higher use of the information source.

6. Secondary content analysis may be used for summarizing the contents of the collection. Such summarization may be used to determine if the collection is worth keeping.

7. Secondary content analysis may be used for understanding the relationship between the documents in the collection.

8. Secondary content analysis may be used for picking individual documents within the collection. This may be done through an analysis which provides a visualization of the collection.

Figure 6:
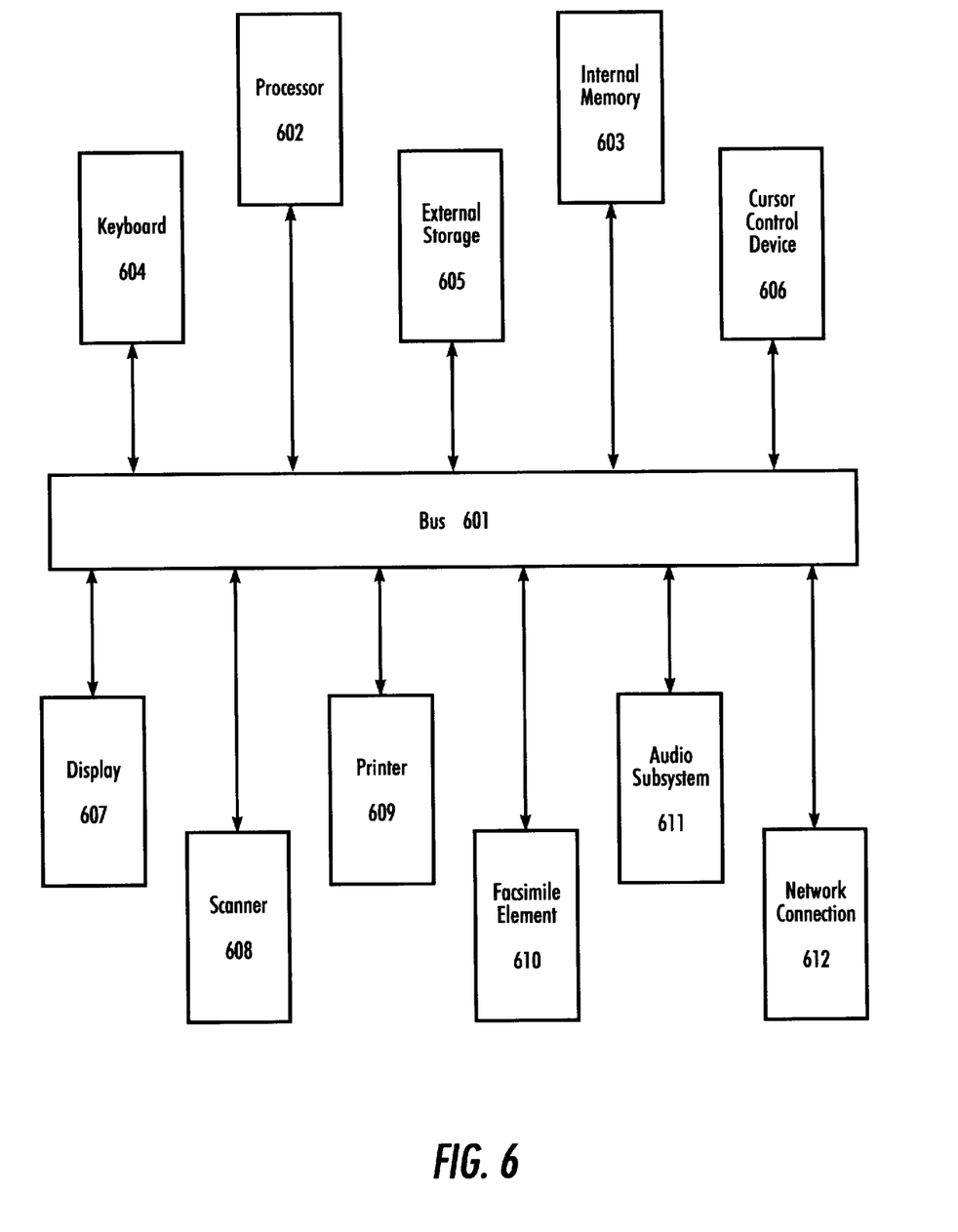
FIG. 6 is a block diagram of a computer based system upon which the IA client may be implemented.

Computer Based System of the Currently Preferred Embodiment of The Present Invention The computer based system on which the currently preferred embodiment of the present invention may be implemented is described with reference to FIG. 6. Referring to FIG. 6, the computer based system is comprised of a plurality of components coupled via a bus 601. The bus 601 illustrated here is simplified in order not to obscure the present invention. The bus 601 may consist of a plurality of parallel buses (e.g. address, data and status buses) as well as a hierarchy of buses (e.g. a processor bus, a local bus and an I/O bus). In any event, the computer system is further comprised of a processor 602 for executing instructions provided via bus 601 from Internal memory 603 (note that the Internal memory 603 is typically a combination of Random Access or Read Only Memories). The processor 602 and Internal memory ROM 603 may be discrete components or a single integrated device such as an Application Specification Integrated Circuit (ASIC) chip.

Also coupled to the bus 601 are a keyboard 604 for entering alphanumeric input, external storage 605 for storing data, a cursor control device 606 for manipulating a cursor, and a display 607 for displaying visual output. The keyboard 604 would typically be a standard QWERTY keyboard but may also be telephone like keypad. The external storage 605 may be fixed or removable magnetic or optical disk drive. The cursor control device 606 will typically have a button or switch associated with it to which the performance of certain functions can be programmed.

Optional elements that could be coupled to the bus 601 would include scanner 608, printer 609, facsimile element 610, audio subsystem 611 and network connection 612. The scanner 608 provides a means for creating a bit-mapped representation of a medium (i.e. a scanned document image). The printer 609 could be used to print the bit-mapped representation after it has been edited. The facsimile element 610 could be used for facsimile transmittal of the bit-mapped representation after it has been edited. Note that the facsimile element 610 could utilize the functionality of the scanner 610 and printer 611 to create the full functionality of a facsimile device. The audio subsystem 611 may be used to render and replay audio based data. The network connection 612 would be used to receive and/or transmit data containing a bit-mapped representation of a medium.

Thus, an information retrieval system providing secondary content analysis on retrieved collections of documents is disclosed. While the present invention is described with respect to a preferred embodiment, it would be apparent to one skilled in the art to practice the present invention with other configurations of information retrieval systems. Such alternate embodiments would not cause departure from the spirit and scope of the present invention.

I claim:

1. In an information retrieval system for accessing information from one or more Information Sources, an improved user workspace for interfacing into said information retrieval system for obtaining information responsive to a query directed to a plurality of Information Sources, said improved user workspace having a display, interface means for interfacing with said plurality of Information Sources, and query input means, said improvement comprising:

receiving means for receiving documents from said plurality of Information Sources;

storage means coupled to said receiving means, said storage means for storing a collection of documents;

a secondary content analysis engine for analyzing said collection of documents and generating statistical information relating to the content of said collection of documents; and one or more functional means coupled to said secondary content analysis engine, each of said one or more functional means for generating information describing said collection that may be used for refining a query or understanding said collection.

2. The improved user workspace as recited in claim 1 wherein one of said one or more functional means is a scatter/gather browser.

3. The improved user workspace as recited in claim 1 wherein one of said one or more functional means is a snippet search browser.

4. The improved user workspace as recited in claim 1 wherein one of said one or more functional means is a relative relevance analyzer.

5. The improved user workspace as recited in claim 1 wherein one of said one or more functional means is a similarity search browser.

6. The improved user workspace as recited in claim 1 wherein one of said one or more functional means is a collection summarizer.

7. The improved user workspace as recited in claim 6 wherein one of said one or more functional means provides a visualization of said collection summarizer.

8. The improved user workspace as recited in claim 1 wherein said collection of documents is ephemeral.

9. The improved user workspace as recited in claim 8 wherein each document in said collection of documents is comprised primarily of text and said secondary content analysis engine is further comprised of:

a tokenizer for generating tokens from the text of the ephemeral collection of documents;

one or more filters for filtering tokens yielding a remaining set of tokens for a document; and a statistics collector for generating statistics from said remaining set of tokens.

10. The improved user workspace as recited in claim 9 wherein said statistics collector is further comprised of a first means for collecting statistics at a document level and a second means for collecting statistics as a collection level.

11. A method for querying a plurality of Information Sources comprising the steps of:

a) a user generating a query from a client workspace;

b) processing said query into a plurality of sub-queries, each of said plurality of sub-queries directed to a corresponding one of said plurality of Information Sources;

c) receiving results of each of said sub-queries at said client workspace, each instance of said results of said sub-queries comprising one or more documents;

d) generating a document collection from said results of each of said sub-queries;

e) analyzing said document collection to create statistical content information for said document collection at said client workspace;

f) creating query refinement information using said statistical content information;

g) said user refining a query based on said query refinement information;

h) said user repeating steps f)–g) until said refined query yields a result acceptable to said user.

12. The method as recited in claim 11 wherein each document in said document collection includes a text portion and said step of analyzing said document collection to create statistical content information for said document collection at said client workspace is further comprised of the step of:

processing each of said documents in said document collection by performing the steps of:

e1) tokenizing the text portion of said document to create document tokens;

e2) filtering document tokens yielding a remaining set of tokens; and e3) generating statistics from said remaining set of tokens.

13. The method as recited in claim 12 wherein said step of creating query refinement information using said statistical content information is further comprised of the step of generating a scatter representation of said document collection into related groups, and said step of said user refining a query based on said query refinement information is comprised of said user selecting one or more of said related groups.

14. The method as recited in claim 12 wherein said step of said user refining a query based on said query refinement information is further comprised of the step of said user selecting relevant documents.

15. The method as recited in claim 14 wherein in subsequent iterations of said step f) creating query refinement information using said statistical content information is comprised of the step of said system generating a new query based on said selected relevant documents.

16. The method as recited in claim 12 wherein said step of creating query refinement information using said statistical content information is further comprised of the steps of:

mapping each document to an n-dimensional vector space based on word occurrence;

identifying similar documents based on their proximity in said n-dimensional vector space; and providing said identified similar documents as query refinement information.

17. The method as recited in claim 12 wherein said step of generating statistics from said remaining set of tokens is further comprised of the steps of:

generating a first set of statistics at the document level; and generating a second set of statistics at the collection level.

18. An information retrieval system for retrieving information from a plurality of Information Sources, said plurality of Information Sources accessible through a network, said information retrieval system comprising:

an information access client for performing queries requesting information from said one or more Information Sources, said information access client comprising a statistical content analysis engine for analyzing a collection of documents resulting from a query and generating statistical information reflecting said collection of documents, each document in said collection of documents having a text part, and one or more query refinement means coupled to said content analysis engine, each of said one or more query refinement means for generating information that may be used for refining a query;

an intermediary server coupled to each of said one or more Information Sources and coupled to said information access client, said intermediary server for mediating queries between said information access client and said one or more Information Sources, said intermediary server comprising:

network access means for accessing information servers on said network;

means for translating an access request of said user workspace to particular protocols utilized by said each of said one or more Information Sources; and means for receiving the requested information from said access request and merging said received requested information into said collection of documents.

19. The system as recited in claim 18 wherein said statistical content analysis engine is further comprised of:

a tokenizer for generating tokens from said text part of said documents of said collection of documents;

one or more filters for filtering tokens yielding a remaining set of tokens for an instance of a document; and a statistics collector for generating statistics from said remaining set of tokens.

20. The system as recited in claim 19 wherein said statistics collector is further comprised of a first means for collecting statistics at a document level and a second means for collecting statistics at a document collection level.

* * * * *